United States Patent
Zhou et al.

(10) Patent No.: US 10,945,032 B2
(45) Date of Patent: Mar. 9, 2021

(54) METHOD AND SYSTEM FOR REMOTELY CONTROLLING SMART TELEVISION BASED ON MOBILE TERMINAL

(71) Applicant: Huizhou TCL Mobile Communication Co., Ltd., HuiZhou (CN)

(72) Inventors: Xiuling Zhou, HuiZhou (CN); Xiaolu Zhou, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/469,090

(22) PCT Filed: Dec. 7, 2017

(86) PCT No.: PCT/CN2017/115061
§ 371 (c)(1),
(2) Date: Jun. 12, 2019

(87) PCT Pub. No.: WO2018/108024
PCT Pub. Date: Jun. 21, 2018

(65) Prior Publication Data
US 2020/0099980 A1    Mar. 26, 2020

(30) Foreign Application Priority Data
Dec. 13, 2016 (CN) .......................... 201611145928.4

(51) Int. Cl.
*H04N 21/442* (2011.01)
*G06K 9/00* (2006.01)
(Continued)

(52) U.S. Cl.
CPC ... *H04N 21/44204* (2013.01); *G06K 9/00228* (2013.01); *H04N 21/4222* (2013.01); (Continued)

(58) Field of Classification Search
CPC .......... H04N 21/44204; H04N 5/4403; H04N 21/4222; H04N 21/4227; H04N 21/4758; H04N 21/4882; G06K 9/00228
See application file for complete search history.

(56) References Cited

U.S. PATENT DOCUMENTS

2013/0059645 A1* 3/2013 Smock ................... A63F 13/80
463/24
2013/0330084 A1* 12/2013 Du ......................... G08C 23/04
398/106
(Continued)

FOREIGN PATENT DOCUMENTS

CN    101998161 A    3/2011
CN    102075705 A    5/2011
(Continued)

*Primary Examiner* — Nasser M Goodarzi
*Assistant Examiner* — Adil Ocak
(74) *Attorney, Agent, or Firm* — Kirton McConkie; Evan R. Witt (57) ABSTRACT

A method and a system for remotely controlling a smart television based on a mobile terminal and the mobile terminal are disclosed. The method includes: detecting a state of the smart television every predetermined time interval by the mobile terminal, and receiving a command input from a user to acquire a type of an audience watching the smart television; determining whether a current playing time, a playing content and a playing duration conform to conditions preset by a user, when the audience watching the smart television is a minor; and detecting whether the smart television is in a turned-on state when the audience watching the smart television is an older person.

7 Claims, 3 Drawing Sheets

(51) Int. Cl.
*H04N 21/422* (2011.01)
*H04N 21/4227* (2011.01)
*H04N 21/475* (2011.01)
*H04N 21/488* (2011.01)
*H04N 21/45* (2011.01)

(52) U.S. Cl.
CPC ... *H04N 21/4227* (2013.01); *H04N 21/42204* (2013.01); *H04N 21/4758* (2013.01); *H04N 21/4882* (2013.01); *G06K 2009/00322* (2013.01); *H04N 21/42206* (2013.01); *H04N 21/4532* (2013.01)

(56) References Cited

U.S. PATENT DOCUMENTS

| | | | |
|---|---|---|---|
| 2014/0229965 A1* | 8/2014 | Beskrovny | H04N 21/44218 725/14 |
| 2015/0245095 A1* | 8/2015 | Gonzalez | H04N 21/4751 725/28 |
| 2016/0112768 A1* | 4/2016 | Kim | H04N 21/8133 725/19 |

FOREIGN PATENT DOCUMENTS

| | | |
|---|---|---|
| CN | 102469368 A | 5/2012 |
| CN | 105629746 A | 6/2016 |
| CN | 106792042 A | 5/2017 |

\* cited by examiner

FIG. 1

| Type | Stage | | Difficult levels |
|---|---|---|---|
| English | Elementary school | Grade 1 | Low |
| | | | Middle |
| | | | High |
| | | Grade 2 | ... |
| | | ... | ... |
| | | Grade 5 | Low |
| | | | Middle |
| | | | High |

METHOD AND SYSTEM FOR REMOTELY CONTROLLING SMART TELEVISION BASED ON MOBILE TERMINAL

CROSS REFERENCE TO RELATED APPLICATIONS

This application is the National Stage of International Application No. PCT/CN2017/115061, filed on Dec. 7, 2017, which claims the priority of Chinese patent application No. 201611145928.4 filed on Dec. 13, 2016 in the SIPO (State Intellectual Property Office of the P.R.C.) and titled "METHOD AND SYSTEM FOR REMOTELY CONTROLLING SMART TELEVISION BASED ON MOBILE TERMINAL". The entire disclosures of the above applications are incorporated herein by reference.

BACKGROUND

Field

The present disclosure relates to a mobile terminal technology field, and more particularly to a method and a system for remotely controlling a smart television based on a mobile terminal and the mobile terminal.

Background

With the increasing of living standards, watching television programs has become a very important entertainment in people's daily life. The television programs are various and abundant. Various types of programs are highly targeted according to markets and are recorded according to different types and different ages of audiences. Recognition ability and self-control ability of minors are poor, and thus it is unavoidable to watch contents that are not suitable for the minors. Contents having bright colors and wonderful contents shown by the television programs continuously attract attention of the minors, and the self-control ability of the minors is poor. Accordingly, the minors spend a long time watching the television programs, and vision and physical health of the minors are damaged. Therefore, a problem of how to remotely monitor and control the contents and time of the television programs for the minors has become urgent for parents.

In the current urban life, the elderly are generally at home alone. In the meantime, watching the television programs has become an important entertainment for the elderly. However, current smart televisions have many functions and are complex to be operated. A problem that the elderly cannot use a smart television exists.

Therefore, in the prior art, users can turn on or off, only at home, the smart television to control the television programs to be played for the elderly, and only at home, can control the time and contents of watching the televisions for the minors. When the users are not at home, they cannot process. This brings inconvenience to control the elderly and the minors to watch the television programs.

Consequently, the prior art needs to be improved and developed.

SUMMARY OF THE DISCLOSURE

An embodiment of the present disclosure provides a method and a system for remotely controlling a smart television based on a mobile and the mobile terminal capable of solving the technical problems in the prior art that users can turn on or off, only at home, the smart television to control the television programs to be played for the elderly, and only at home, can control the time and contents of watching the televisions for the minors. When the users are not at home, they cannot process. This brings inconvenience to control the elderly and the minors to watch the television programs.

In a first aspect, an embodiment of the present disclosure provides a mobile terminal comprising at least one processor; and at least one memory. The at least one memory is configured to instructions and data. The at least one processor is configured to execute the steps of:

Establishing a link between the mobile terminal and a smart television, detecting a state of the smart television every predetermined time interval by the mobile terminal, receiving, by the mobile terminal an image located in front of the smart television and transmitted by the smart television, extracting facial features in the image according to an image processing algorithm, and determining that an audience watching the smart television is a minor or an older person according to the facial features in the image;

Acquiring, by the mobile terminal, a current playing time, a playing content and a playing duration of the smart television and determining whether the current playing time, the playing content and the playing duration conform to conditions preset by a user, when the audience watching the smart television is the minor; if yes, the smart television continues to play; if no, the smart television is controlled to display a hint of switching a channel or to increase or decrease watching time according to answer results of the audience after entering a reward and punishment display process; and Detecting whether the smart television is in a turned-on state by the mobile terminal when the audience watching the smart television is the older person; the smart television is controlled to be turned on to play a television program when the smart television is in the turned-off state.

Before the step of establishing the link between the mobile terminal and the smart television, further comprising the step of:

Presetting an allowable playing time, an allowable playing content and an allowable playing duration corresponding to the smart television when the audience is the minor.

The step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to display the hint of switching the channel, specifically comprises the steps of:

Starting to count time of the playing duration and determining whether the playing time of the smart television is within the preset allowable playing time, when the audience watching the smart television is the minor and information of the turned-on state of the smart television is acquired;

Determining whether the displayed content conforms to the preset allowable playing content when the playing time of the smart television is within the preset allowable playing time; determining whether the playing duration is longer than or equal to the preset allowable playing duration when the displayed content conforms to the preset allowable playing content; controlling the smart television to remind to turn off the smart television when the playing duration is longer than the preset allowable playing duration; and Controlling the smart television to remind to turn off the smart television when the playing time of the smart television is not within the preset allowable playing time.

The step of controlling the smart television to remind to turn off the smart television comprises the steps of:

Controlling the mobile terminal remotely a button for turning off the smart television, so as to turn off the smart television.

After the step of starting to count the time of the playing duration, further comprising the step of:

Transmitting a text, a voice or a video that is recorded by the user of the mobile terminal now or in advance to the smart television to the smart television via a network, so as to remind the audience of the smart television to rest or exercise, when the counted time is equal to a rest time preset by the user of the mobile terminal.

The step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to increase or decrease the watching time according to the answer results of the audience after entering the reward and punishment display process, specifically comprising the steps of:

Starting to count time of the playing duration and determining whether the playing time of the smart television is within the preset allowable playing time, when the audience watching the smart television is the minor and information of the turned-on state of the smart television is acquired;

Determining whether the displayed content conforms to the preset allowable playing content when the playing time of the smart television is within the preset allowable playing time; determining whether the playing duration is longer than or equal to the preset allowable playing duration when the displayed content conforms to the preset allowable playing content; increasing or decreasing the watching time according to the answer results of the audience after the smart television is controlled to enter the reward and punishment display process, when the playing duration is longer than the preset allowable playing duration; and Increasing or decreasing the watching time according to the answer results of the audience after the smart television is controlled to enter the reward and punishment display process, when the playing time is not within the preset allowable playing time.

The step of increasing or decreasing the watching time according to the answer results of the audience after the smart television is controlled to enter the reward and punishment display process specifically comprises the steps of:

Controlling the smart television to enter the reward and punishment display process, receiving a command from the user by the mobile terminal, outputting questions selected from a preset question database, and prompting the audience to answer the questions; and Receiving the answer results of the audience, determining whether a number of the questions having correct answers is greater than or equal to an answer threshold value preset by the user of the mobile terminal; if the number of the questions having the correct answers is greater than the answer threshold value, the mobile terminal controls the smart television to extend the current playing duration; if the number of the questions having the correct answers is fewer than the answer threshold value, the mobile terminal controls the smart television to be turned off and to shorten a playing duration of the smart television next time.

In a second aspect, an embodiment of the present disclosure provides a method for remotely controlling a smart television based on a mobile, wherein the method comprises the steps of:

Establishing a link between the mobile terminal and a smart television, detecting a state of the smart television every predetermined time interval by the mobile terminal, and receiving a command input from a user to acquire a type of an audience watching the smart television;

Acquiring, by the mobile terminal, a current playing time, a playing content and a playing duration of the smart television and determining whether the current playing time, the playing content and the playing duration conform to conditions preset by a user, when the audience watching the smart television is a minor; if yes, the smart television continues to play; if no, the smart television is controlled to display a hint of switching a channel or to increase or decrease watching time according to answer results of the audience after entering a reward and punishment display process; and Detecting whether the smart television is in a turned-on state by the mobile terminal when the audience watching the smart television is an older person; the smart television is controlled to be turned on to play a television program when the smart television is in the turned-off state.

In the method for remotely controlling the smart television based on the mobile terminal, before the step of establishing the link between the mobile terminal and the smart television, the method further comprising the step of:

Presetting an allowable playing time, an allowable playing content and an allowable playing duration corresponding to the smart television when the audience is the minor.

The step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to display the hint of switching the channel, specifically comprises the steps of:

Starting to count time of the playing duration and determining whether the playing time of the smart television is within the preset allowable playing time, when the audience watching the smart television is the minor and information of the turned-on state of the smart television is acquired;

Determining whether the displayed content conforms to the preset allowable playing content when the playing time of the smart television is within the preset allowable playing time; determining whether the playing duration is longer than or equal to the preset allowable playing duration when the displayed content conforms to the preset allowable playing content; controlling the smart television to remind to turn off the smart television when the playing duration is longer than the preset allowable playing duration; and Controlling the smart television to remind to turn off the smart television when the playing time of the smart television is not within the preset allowable playing time.

The step of controlling the smart television to remind to turn off the smart television comprises the steps of:

Controlling the mobile terminal remotely a button for turning off the smart television, so as to turn off the smart television.

After the step of starting to count the time of the playing duration, the method further comprising the step of:

Transmitting a text, a voice or a video that is recorded by the user of the mobile terminal now or in advance to the smart television to the smart television via a network, so as to remind the audience of the smart television to rest or exercise, when the counted time is equal to a rest time preset by the user of the mobile terminal.

In the method for remotely controlling the smart television based on the mobile terminal, the step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to increase or decrease the watching time according to the answer results of the audience after entering the reward and punishment display process, specifically comprising the steps of:

Starting to count time of the playing duration and determining whether the playing time of the smart television is within the preset allowable playing time, when the audience watching the smart television is the minor and information of the turned-on state of the smart television is acquired;

Determining whether the displayed content conforms to the preset allowable playing content when the playing time of the smart television is within the preset allowable playing time; determining whether the playing duration is longer than or equal to the preset allowable playing duration when the displayed content conforms to the preset allowable playing content; increasing or decreasing the watching time according to the answer results of the audience after the smart television is controlled to enter the reward and punishment display process, when the playing duration is longer than the preset allowable playing duration; and Increasing or decreasing the watching time according to the answer results of the audience after the smart television is controlled to enter the reward and punishment display process, when the playing time is not within the preset allowable playing time.

In the method for remotely controlling the smart television based on the mobile terminal, the step of increasing or decreasing the watching time according to the answer results of the audience after the smart television is controlled to enter the reward and punishment display process specifically comprises the steps of:

Controlling the smart television to enter the reward and punishment display process, receiving a command from the user by the mobile terminal, outputting questions selected from a preset question database, and prompting the audience to answer the questions; and Receiving the answer results of the audience, determining whether a number of the questions having correct answers is greater than or equal to an answer threshold value preset by the user of the mobile terminal; if the number of the questions having the correct answers is greater than the answer threshold value, the mobile terminal controls the smart television to extend the current playing duration; if the number of the questions having the correct answers is fewer than the answer threshold value, the mobile terminal controls the smart television to be turned off and to shorten a playing duration of the smart television next time.

In a third aspect, an embodiment of the present disclosure provides a system for remotely controlling a smart television based on a mobile terminal. The system comprises at least one processor; at least one memory; and at least one application program. The at least one application program is stored in the at least one memory and configured to be executed by the at least one processor, and the at least one application program comprises:

A link and detecting module configured to establish a link between the mobile terminal and a smart television, detect a state of the smart television every predetermined time interval, and receive a command input from a user to acquire a type of an audience watching the smart television;

A first control module configured to acquire a current playing time, a playing content and a playing duration of the smart television and determine whether the current playing time, the playing content and the playing duration conform to conditions preset by a user, when the audience watching the smart television is a minor; if yes, the smart television continues to play; if no, the smart television is controlled to display a hint of switching a channel or to increase or decrease watching time according to answer results of the audience after entering a reward and punishment display process; and A second control module configured to detect whether the smart television is in a turned-on state by the mobile terminal when the audience watching the smart television is an older person; the smart television is controlled to be turned on to play a television program when the smart television is in the turned-off state.

The system for remotely controlling the smart television based on the mobile terminal further comprises:

A presetting module configured to preset an allowable playing time, an allowable playing content and an allowable playing duration corresponding to the smart television when the audience is the minor.

In the system for remotely controlling the smart television based on the mobile terminal, the first control module specifically comprises:

A first playing time determination unit configured to start to count time of the playing duration and determine whether the playing time of the smart television is within the preset allowable playing time, when the audience watching the smart television is the minor and information of the turned-on state of the smart television is acquired;

A playing content determination and reminding unit configured to determine whether the displayed content conforms to the preset allowable playing content when the playing time of the smart television is within the preset allowable playing time, determine whether the playing duration is longer than or equal to the preset allowable playing duration when the displayed content conforms to the preset allowable playing content, and control the smart television to remind to turn off the smart television when the playing duration is longer than the preset allowable playing duration; and A first control unit configured to control the smart television to remind to turn off the smart television when the playing time of the smart television is not within the preset allowable playing time.

In the system for remotely controlling the smart television based on the mobile terminal, the first control module specifically comprises:

A second playing time determination unit configured to start to count time of the playing duration and determine whether the playing time of the smart television is within the preset allowable playing time, when the audience watching the smart television is the minor and information of the turned-on state of the smart television is acquired;

A playing content determination and control unit configured to determine whether the displayed content conforms to the preset allowable playing content when the playing time of the smart television is within the preset allowable playing time, determine whether the playing duration is longer than or equal to the preset allowable playing duration when the displayed content conforms to the preset allowable playing content, and control the smart television to increase or decrease the watching time according to the answer results of the audience after the smart television is controlled to enter the reward and punishment display process; and A second control unit configured to control the smart television to increase or decrease the watching time according to the answer results of the audience after the smart television is controlled to enter the reward and punishment display process, when the playing time of the smart television is not within the preset allowable playing time.

In the system for remotely controlling the smart television based on the mobile terminal, controlling the smart television to increase or decrease the watching time according to answer results of the audience after the smart television is controlled to enter the reward and punishment display process specifically comprises: controlling the smart television to enter the reward and punishment display process, receiving a command from the user by the mobile terminal, outputting questions selected from a preset question database, and prompting the audience to answer the questions;

The link and detecting module is specifically configured to establish the link between the mobile terminal and the smart television, detect the state of the smart television every predetermined time interval, receive an image located in front of the smart television and transmitted by the smart television, extract facial features in the image according to an image processing algorithm, and determining that an audience watching the smart television is the minor or the older person according to the facial features in the image.

The present disclosure provides a method and a system for remotely controlling a smart television based on a mobile and the mobile terminal. The present disclosure can control the watching time and the watched content of the minor at home, so as to avoid unnecessary mental and physical injury caused by watching the television programs. A learning objective can be achieved by the reward and punishment method in the process of watching the smart television, and the trouble that the older person cannot use the smart television at home alone can be solved.

DETAILED DESCRIPTION OF THE PREFERRED EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Figure 1:
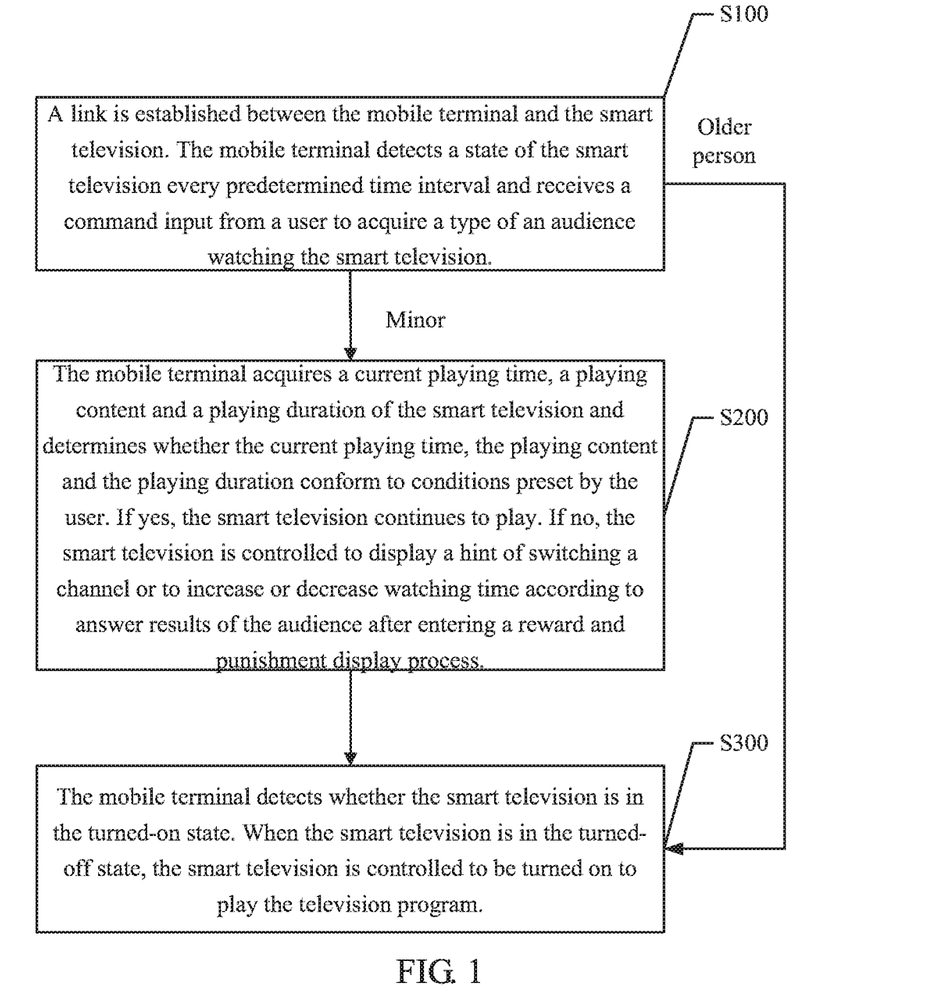
FIG. 1 illustrates a flow chart of a method for remotely controlling a smart television based on a mobile terminal in accordance with a preferred embodiment of the present disclosure.

The present disclosure provides a method for remotely controlling a smart television based on a mobile terminal in accordance with a preferred embodiment. As shown in FIG. 1, the method includes the following steps.

In step S100, a link is established between the mobile terminal and the smart television. The mobile terminal detects a state of the smart television every predetermined time interval and receives a command input from a user to acquire a type of an audience watching the smart television. When the audience watching the smart television is a minor, step S200 is performed. When the audience watching the smart television is an older person, step S300 is performed.

In one embodiment, the mobile terminal may include but is not limited to a mobile phone, a tablet computer and so on. The mobile terminal acquires the state (a turned-on or turned-off state) of the smart television via a network in real time. A detecting time interval may be set by the user of the mobile terminal, for example, 5 minutes or 10 minutes. The mobile terminal receives the input of the user to acquire the type of the audience watching the smart television and performs different operations according to the type of the audience. In detail, a camera may be disposed on the smart television to acquire an image in front of the smart television. The acquire image is transmitted to the mobile terminal when the mobile terminal detects the state of the smart television. The mobile terminal extracts facial features in the image according to an image processing algorithm and determines that the audience watching the smart television is a minor or an older person according to the facial features in the image.

The mobile terminal acquires the turned-on state of the smart television. When the turned-on state is not allowed, the user of the mobile terminal can select to remotely control a button for turning off the smart television. When it is detected that contents played by the television is not suitable, the user of the terminal can select to remotely control a button for switching a channel of the television. Volume or screen brightness may be remotely controlled to be adjusted according requirements.

In one further embodiment, the method further includes step S before step S100.

In step S, an allowable playing time, an allowable playing content and an allowable playing duration corresponding to the smart television are preset when the audience is the minor.

In one embodiment, the user can preset, by himself or herself, the allowable playing time, the allowable playing content and the allowable playing duration of the television according to an age and a learning type of the minor at home. For example, the user may set longer dramas or television dramas affecting growth of the minor as contents that are not allowed to be played or set some intellectual programs as contents that allowed to be played. For the growth of the minor, daytime may be set as an allowable playing time. For example, the daytime 8:00-21:00 is set as the allowable playing time. The allowable playing duration may be set according to requirements as well, for example, one hour or two hours. Preferably, the user may set a real time. For example, when the allowable playing duration is one hour, the rest time may be set as 0.5 hour.

In step S200, the mobile terminal acquires a current playing time, a playing content and a playing duration of the smart television and determines whether the current playing time, the playing content and the playing duration conform to conditions preset by the user. If yes, the smart television continues to play. If no, the smart television is controlled to display a hint of switching a channel or to increase or decrease watching time according to answer results of the audience after entering a reward and punishment display process.

In one embodiment, the smart terminal starts timing when receiving information of the turned-on state. When the timing is equal to the rest time or the allowable playing duration preset by the user of the terminal and it is determined whether the current playing time is within the playing time preset by the user, the user of the terminal is reminded that the rest time reaches. The user of the terminal acquires the played content of the smart television via the network in real time, so that the user of the mobile terminal determines whether the watched contents are suitable. When the above conditions are not conformed, the user of the terminal may push the hint to the smart television via the network. Alternatively, the user of the terminal may notify the audience of the television that reward and punishment time reaches, so as to start to question or remind the user to turn off the television.

In one further embodiment, step S200 specifically includes the following steps.

In step S201, when the audience watching the smart television is the minor and the information of the turned-on state of the smart television is acquired, time of the playing duration starts to be counted and it is determined whether the playing time of the smart television is within the preset allowable playing time. If yes, step S202 is performed. If no, step S204 is performed.

In step S202, it is determined whether the displayed content conforms to the preset allowable playing content. If yes, step S203 is performed. If no, step S204 is performed.

In step S203, it is determined whether the playing duration is longer than or equal to the preset allowable playing duration. If yes, step S204 is performed. If no, the smart television continues to play, and step S201 is performed.

In step S204, the smart television is controlled to remind to turn off the smart television.

In one embodiment, when the mobile terminal receives the information of the turn-on state of the television, the time starts to be counted. When the counted time is equal to the rest time preset by the user of the terminal, the user of the terminal is reminded that the rest time reaches. The user of the terminal can push, via the network, a text, a voice or a video that is recorded by the user of the terminal now or in advance to the smart television, so as to remind the audience of the smart television to rest or exercise. The rest may be reminding to drink water, playing eye exercises or other exercises to be done by the audience. The rest or exercise time is a time duration which is preset by the user of the mobile terminal, for example, 10 minutes or 15 minutes. When the counted time reaches the allowable playing duration that is preset by the user of the smart terminal, for example, 1 hour or 1.5 hours, the mobile terminal notifies the television to remind the user to turn off the television. In the meantime, the user of the terminal acquires the played content of the smart television via the network in real time, so that the user of the mobile terminal determines whether the watched content is suitable. If the watched content does not conform to the preset allowable playing content, the television is controlled to remind the user to turn off the television.

In one further embodiment, step S200 specifically includes the following steps.

In S211, when the audience watching the smart television is the minor and the information of the turned-on state of the smart television is acquired, time of the playing duration starts to be counted and it is determined whether the playing time of the smart television is within the preset allowable playing time. If yes, step S212 is performed. If no, step S214 is performed.

In step S212, it is determined whether the displayed content conforms to the preset allowable playing content. If yes, step S213 is performed. If no, step S214 is performed.

In step S213, it is determined whether the playing duration is longer than or equal to the preset allowable playing duration. If yes, step S214 is performed. If no, the smart television continues to play, and step S211 is performed.

In step S214, the watching time is increased or decreased according to answer results of the audience after the smart television is controlled to enter a reward and punishment display process.

In one embodiment, when the mobile terminal receives the information of the turn-on state of the television, the time starts to be counted. When the counted time is equal to the rest time preset by the user of the terminal, the user of the terminal is reminded that the rest time reaches. The user of the terminal can push, via the network, a text, a voice or a video that is recorded by the user of the terminal now or in advance to the smart television, so as to remind the audience of the smart television to rest or exercise. The rest may be reminding to drink water, playing eye exercises or other exercises to be done by the audience. The rest or exercise time is a time duration which is preset by the user of the mobile terminal, for example, 10 minutes or 15 minutes. When the counted time reaches the allowable playing duration that is preset by the user of the smart terminal, for example, 1 hour or 1.5 hours, the watching time is increased or decreased according to the answer results of the audience after the smart television is controlled to enter the reward and punishment display process. In the meantime, the user of the terminal acquires the played content of the smart television via the network in real time, so that the user of the mobile terminal determines whether the watched content is suitable. If the watched content does not conform to the preset allowable playing content, the watching time is increased or decreased according to the answer results of the audience after the smart television is controlled to enter the reward and punishment display process.

The step of increasing or decreasing the watching time according to the answer results of the audience after the smart television is controlled to enter the reward and punishment display process specifically includes the following steps.

In step S221, the smart television is controlled to enter the reward and punishment display process. The mobile terminal receives a command from the user of the mobile terminal, outputs questions selected from a preset question database and prompts the audience to answer the questions.

In step S222, the answer results of the audience are received, and it is determined whether a number of the questions having correct answers is greater than or equal to an answer threshold value preset by the user of the terminal. If the number of the questions having correct answers is greater than the answer threshold value, the mobile terminal controls the smart television to extend the current playing duration. If the number of the questions having correct answers is fewer than the answer threshold value, the mobile terminal controls the smart television to be turned off and to shorten a playing duration of the smart television next time.

Figure 2:
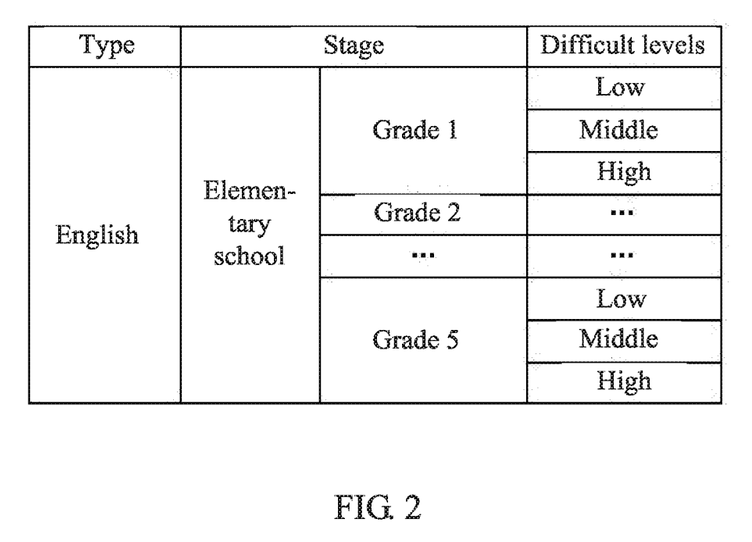
FIG. 2 illustrates classification types of a question database in the method for remotely controlling the smart television based on the mobile terminal in accordance with an embodiment of the present disclosure.

In one embodiment, after the smart television is controlled to enter the reward and punishment play process, the user of the mobile terminal can select different types and different difficulties of questions according to a learning condition of the minor. The problems can be selected from the smart question database, or the user of the terminal uses questions which are uploaded by himself or herself. The smart question database can be classified into English, mathematics, chemistry, physics and so on. Stages are classified into preschool education (small class, middle class, large class), elementary school (grades 1-5) and junior high school (grades 1-3). Difficult levels are classified into low, middle and high. The classification types of the question database are shown in FIG. 2.

The questions and the corresponding answers are stored in the smart question database. When the questions begin, a smart reward and punishment module performs an answer analysis and statistics and compares the answers of the user and the answers in the question database to acquire the number of the questions having the correct answers. When the user of the mobile terminal selects the questions which are uploaded by himself or herself, the user can acquire the answers of the user of the smart television and compares manually.

A reward or punishment operation is performed. When the number of the questions having the correct answers reaches the threshold value preset by the user, the user of the smart terminal can perform the reward operation to extent the time of watching the television. The user can set a reward time, for example, 20 minutes or 30 minutes. When the questions end and the number of the questions having the correct answers does not reach the threshold value preset by the user, the user of the terminal can perform the punishment operation to turn off the television and shorten the time of watching the television next time.

In step S300, the mobile terminal detects whether the smart television is in the turned-on state. When the smart television is in the turned-off state, the smart television is controlled to be turned on to play the television program.

In one embodiment, the mobile terminal detects whether the smart television is turned on. Since the older person is not familiar with the operations of the smart television, the user of the mobile terminal can acquire the state of the smart television via the mobile terminal. When the smart television is in the turned-off state, the smart television is controlled to be turned on to play the program for the older person to watch the television conveniently. When the smart television is in the turned-on state, the user of the mobile terminal can switch the channel of the smart television. As such, the life of the older person can be enriched, and it is convenient for the older person to use the smart television.

In at least one exemplary embodiment, a device can be implemented by one or more application-specific integrated circuits (ASIC), digital signal processors (DSP), digital signal processor devices (DSPD), programmable logic devices (PLD), controllers, micro-controllers, micro-processors or other electronic elements to perform the above-mentioned method.

In at least one exemplary embodiment, a non-transition computer readable storage medium including instructions is provided, for example, a memory including the instructions. The instructions may be executed by the processor of the above-mentioned device to perform the above-mentioned method.

Figure 3:
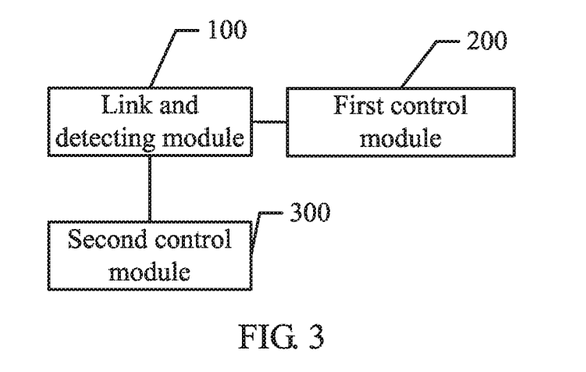
FIG. 3 illustrates a functional block diagram of a system for remotely controlling a smart television based on a mobile terminal in accordance with an embodiment of the present disclosure

The present disclose further discloses a system for remotely controlling a smart television based on a mobile terminal in accordance with a preferred embodiment. As shown in FIG. 3, the system includes the following modules.

A link and detecting module 100 is configured to establish a link between the mobile terminal and the smart television. The mobile terminal is configured to detect a state of the smart television every predetermined time interval and to receive a command input from a user to acquire a type of an audience watching the smart television. An embodiment may be referred to the embodiment of the method described above.

A first control module 200 is configured to acquire a current playing time, a playing content and a playing duration of the smart television and to determine whether the current playing time, the playing content and the playing duration conform to conditions set by the user. If yes, the smart television is configured to continue to play. If no, the smart television is configured to be controlled to display a hint of switching a channel or to increase or decrease watching time according to answer results of the audience after entering a reward and punishment display process. An embodiment may be referred to the embodiment of the method described above.

A second control module 300 is configured to detect whether the smart television is in the turned-on state when the audience watching the smart television is an older person. When the smart television is in the turned-off state, the smart television is controlled to be turned on to play the television program. An embodiment may be referred to the embodiment of the method described above.

The system for remotely controlling the smart television based on the mobile terminal further includes the following module.

A presetting module is configured to preset an allowable playing time, an allowable playing content and an allowable playing duration corresponding to the smart television when the audience is the minor. An embodiment may be referred to the embodiment of the method described above.

In the system for remotely controlling the smart television based on the mobile terminal, the first control module 200 specifically includes the following units.

A first playing time determination unit is configured to start to count time of the playing duration and to determine whether the playing time of the smart television is within the preset allowable playing time, when the audience watching the smart television is the minor and the information of the turned-on state of the smart television is acquired. An embodiment may be referred to the embodiment of the method described above.

A playing content determination and reminding unit is configured to determine whether the displayed content conforms to the preset allowable playing content when the playing time of the smart television is within the preset allowable playing time. The playing content determination and reminding unit is configured to determine whether the playing duration is longer than or equal to the preset allowable playing duration when the displayed content conforms to the preset allowable playing content. The playing content determination and reminding unit is configured to control the smart television to remind to turn off the smart television when the playing duration is longer than the preset allowable playing duration. An embodiment may be referred to the embodiment of the method described above.

A first control unit is configured to control the smart television to remind to turn off the smart television when the playing time of the smart television is not within the preset allowable playing time. An embodiment may be referred to the embodiment of the method described above.

In the system for remotely controlling the smart television based on the mobile terminal, the first control module 200 specifically includes the following units.

A second playing time determination unit is configured to start to count time of the playing duration and to determine whether the playing time of the smart television is within the preset allowable playing time, when the audience watching the smart television is the minor and the information of the turned-on state of the smart television is acquired. An embodiment may be referred to the embodiment of the method described above.

A playing content determination and control unit is configured to determine whether the displayed content conforms to the preset allowable playing content when the playing time of the smart television is within the preset allowable playing time. The playing content determination and control unit is configured to determine whether the playing duration is longer than or equal to the preset allowable playing duration when the displayed content conforms to the preset allowable playing content. The playing content determination and content unit is configured to control the smart television to increase or decrease the watching time according to answer results of the audience after the smart television is controlled to enter a reward and punishment display process, when the playing duration is longer than the preset allowable playing duration. An embodiment may be referred to the embodiment of the method described above.

A second control unit is configured to control the smart television to increase or decrease the watching time according to the answer results of the audience after the smart television is controlled to enter the reward and punishment display process, when the playing duration is not within the preset allowable playing time. An embodiment may be referred to the embodiment of the method described above.

In the system for remotely controlling the smart television based on the mobile terminal, increasing or decreasing the watching time according to the answer results of the audience after the smart television is controlled to enter the reward and punishment display process specifically includes the following operations. The smart television is controlled to enter the reward and punishment display process. The mobile terminal receives a command from the user of the mobile terminal, outputs questions selected from a preset question database and prompts the audience to answer the questions. The answer results of the audience are received, and it is determined whether a number of the questions having correct answers is greater than or equal to an answer threshold value preset by the user of the terminal. If yes, the mobile terminal controls the smart television to extend the current playing duration. If no, the mobile terminal controls the smart television to be turned off and shorten a playing duration of the smart television next time. An embodiment may be referred to the embodiment of the method described above.

In conclusion, the present disclosure provides a method and a system for remotely controlling a smart television based on a mobile terminal. The method includes: detecting, by the mobile terminal, a state of the smart television every predetermined time interval and receiving a command input from a user to acquire a type of an audience watching the smart television; acquiring, by the mobile terminal, a current playing time, a playing content and a playing duration of the smart television and determining whether the current playing time, the playing content and the playing duration conform to conditions preset by the user, when the audience watching the smart television is a minor; if yes, the smart television continues to play; if no, the smart television is controlled to display a hint of switching a channel or to increase or decrease watching time according to answer results of the audience after entering a reward and punishment display process; detecting, by the mobile terminal, whether the smart television is in a turned-on state, when the audience watching the smart television is an older person; and controlling the smart television to be turned on to play a television program, when the smart television is in a turned-off state. The present disclosure can control the watching time and the watched content of the minor at home, so as to avoid unnecessary mental and physical injury caused by watching the television programs. A learning objective can be achieved by the reward and punishment method in the process of watching the smart television, and the trouble that the older person cannot use the smart television at home alone can be solved.

An embodiment of the present disclosure further provides a storage medium storing computer programs. The computer programs perform the above-mentioned method for remotely controlling the smart television based on the mobile terminal, when executed by a computer.

It should be noted that those skilled in the art may understand all or some of the processes in the methods of the embodiments described above can be realized by using programs to instruct corresponding hardware. The programs may be stored in a computer readable storage medium. The storage medium may include read-only memory (ROM), random access memory (RAM), disk, compact disc (CD), or the like.

Figure 4:
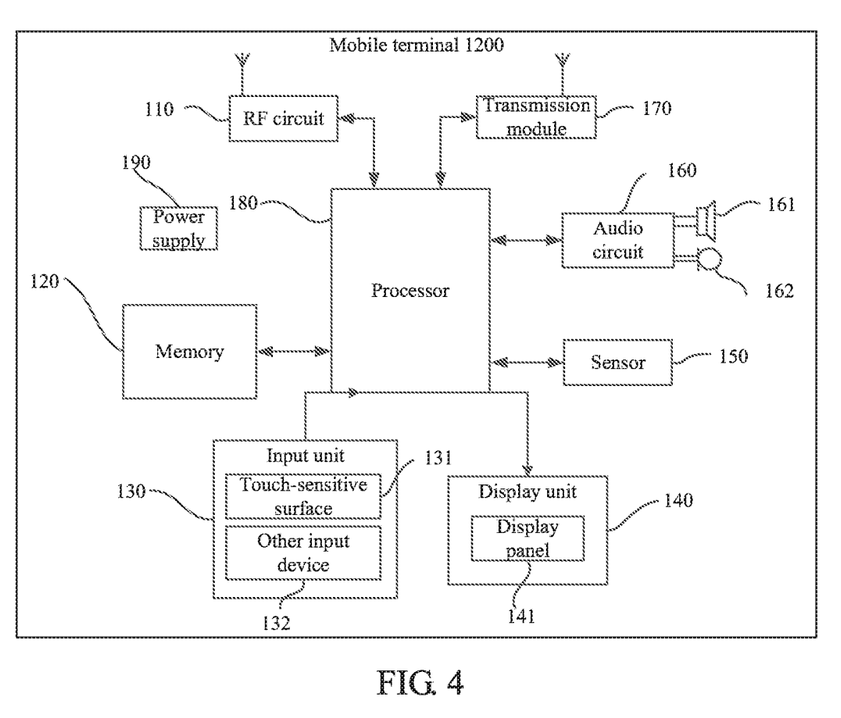
FIG. 4 illustrates a block diagram of a mobile terminal in accordance with an embodiment of the present disclosure.

FIG. 4 illustrates a block diagram of a mobile terminal in accordance with an embodiment of the present disclosure. The mobile terminal may be used to implement the method and system for remotely controlling the smart television based on the mobile terminal provided by the above-mentioned embodiments of the present disclosure. The mobile terminal 1200 may be a smart phone or a tablet computer.

As shown in FIG. 4, the mobile terminal 1200 may include a radio frequency (RF) circuit 110, a memory 120 including one or more computer readable storage mediums (only one is shown in FIG. 4), an input unit 130, a display unit 140, at least one sensor 150, an audio circuit 160, a transmission module 170, a processor 180 including one or more processing cores (only one is shown in FIG. 4), a power supply 190 and the like. Those skilled in the art can understand that the mobile terminal 1200 is not limited to the structure shown in FIG. 4, and may include more or fewer parts than those shown in FIG. 4, or some parts may be combined, or different arrangement of parts may be adopted.

The RF circuit 110 is configured to receive and transmit electromagnetic waves and to realize conversions of the electromagnetic waves and electrical signals, thereby communicating with a communication network or any other device. The RF circuit may include various conventional circuit elements used for performing these functions, for example, an antenna, a radio frequency transmitter, a digital signal processor, an encryption/decryption chip, a subscriber identification module (SIM) card, a memory and the like. The RF circuit 1010 may communicate with various networks, for example, an interne, an intranet or a wireless network, or may communicate with any other device via a wireless network. The above-mentioned wireless network may include a cellular telephone network, a wireless local area network or a metropolitan area network. The above-mentioned wireless network may use various communication standards, protocols and technologies and may include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP) Worldwide Interoperability for Microwave Access (Wi-Max), other protocols for E-mail, instant messaging and Short Messaging Service (SMS) and other suitable communication protocols, and may include protocols which are not developed currently.

The memory 120 may be configured to store software programs and software modules, for example, the program instructions/modules corresponding to the method and system for remotely controlling the smart television based on the mobile terminal in accordance with the above-mentioned embodiments. The processor 180 executes various functional applications and data processing by operating the software programs and the software modules stored in the memory 120. The memory 120 may include a high speed random access memory and also may include a non-volatile memory, such as one or more disk storage devices, a flash memory device or other non-volatile solid storage devices. In some embodiments, the memory 120 may further include a remote memory disposed corresponding to the processor 180. The remote memory may be connected to the mobile terminal 1200 via a network. Examples of the network include but are not limited to an interne, an intranet, a local area network, a mobile communication network and the combinations of them.

The input unit 130 may be configured to receive input number or character information and to generate keyboard, mouse, joystick, optical or trajectory ball signal inputs related to a user's setting and functional control. In detail, the input unit 130 may include a touch-sensitive surface 131 and other input device 132. The touch-sensitive surface 131, also called a touch display screen or a touch panel, may be configured to detect touch operations of a user on or near the touch-sensitive surface 131 (for example, operations carried out by the user through any suitable objects or attachments, such as a finger, a touch pen and the like, on the touch-sensitive surface 131 or near the touch control panel 1031) and to drive a corresponding device connected therewith according to a preset program. Optionally, the touch-sensitive surface 131 may include a touch detection device and a touch controller. The touch detection device detects the touch direction of the user, detects a signal caused by the touch operation and transmits the signal to the touch controller. The touch controller receives touch information from the touch detection device, converts the touch information into a contact coordinate and then transmits the contact coordinate to the processor 180 and may receive a command transmitted by the processor 180 and execute the command. Moreover, the touch-sensitive surface 131 may be one of various types, such as a resistance type, a capacitance type, an infrared type, a surface acoustic wave type and the like. Besides the touch-sensitive surface 131, the input unit 130 also may include other input device 132. In detail, other input device 132 may include, but is not limited to, one or more of a physical keyboard, function keys (such as a volume control key, a switching key and the like), a trackball, a mouse, a joystick and the like.

The display unit 140 may be configured to display information input by the user or information provided for the user and various graphical user interfaces of the mobile terminal 1200. The graphical user interfaces may be constituted by graphics, texts, icons, videos and any combinations of them.

The display unit 140 may include a display panel 141. Optionally, the display panel 141 may be configured in forms of a Liquid Crystal Display (LCD), an Organic Light-Emitting Diode (OLED) and the like. Furthermore, the touch panel 131 may cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. In FIG. 4, the touch-sensitive surface and the display panel 141 are served as two independent parts for accomplishing input and output functions, however, in some embodiments, the touch-sensitive surface 131 and the display panel 1041 may be integrated to accomplish the input and output functions.

The mobile terminal 1200 may further include at least one sensor 150, such as a gyroscope sensor, a magnetic induction sensor, an optical sensor, a motion sensor and other sensors. In detail, the optical sensor may include an environmental light sensor and a proximity sensor. The environmental light sensor may adjust brightness of the display panel 141 according to the lightness of environmental light. The proximity sensor may turn off the display panel 141 and/or backlight when the mobile terminal 1200 approaches an ear. As one type of the motion sensor, an accelerometer sensor may detect the value of an acceleration in each direction (generally in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors may be integrated into the mobile terminal 1200, and explanations are not repeated herein.

The audio circuit 160, a speaker 161 and a microphone 162 may provide an audio interface between the user and the mobile terminal 1200. The audio circuit 160 may transmit an electric signal obtained by converting received audio data to the speaker 161. The electric signal is converted into a sound signal to be outputted by the speaker 161. On the other hand, the microphone 1062 converts a collected sound signal into an electric signal. The audio circuit 1060 receives the electric signal and converts the electric signal into audio data. After the audio data is outputted to the processor 180 and is processed, it is transmitted, for example, to another terminal through the RF circuit 110, or is outputted to the memory 120 in order to be further processed. The audio circuit 160 may further include an ear plug hole for providing communication between an external ear phone and the mobile terminal 1200.

The mobile terminal 1200 can help the user to receive and send E-mails, browse webpages, access streaming media and the like by the transmission module 170 (for example, a Wi-Fi module). The transmission module 170 provides wireless broadband internet access for the user. Although the transmission module 170 is shown in FIG. 4, it should be understood that the transmission module 170 is not the necessary part of the mobile terminal 1200 and may completely be omitted as required without changing the scope of the present disclosure.

The processor 180 is a control center of the mobile terminal 1200, is connected with all the parts of the whole mobile phone by various interfaces and lines and is configured to execute various functions of the mobile terminal 1200 and process the data by operating the software programs and/or the modules stored in the memory 120, and to call the data stored in the memory 120 so as to carry out integral monitoring on the mobile phone. Optionally, the processor 180 may include one or more processing cores. In some embodiments, the processor 180 may be integrated with an application processor and a modulation/demodulation processor. The application processor is mainly configured to process an operating system, at least one user interface, at least one application and the like. The modulation/demodulation processor is mainly configured to process wireless communication. It should be understood that the modulation/demodulation processor may also be not integrated into the processor 180.

The mobile terminal 1200 further includes the power supply 190 (such as a battery) for supplying power to each part. In some embodiments, the power supply may be logically connected with the processor 180 by a power supply management system, so as to implement functions of charge management, discharge management, power consumption management and the like by the power supply management system. The power supply 190 may further include one or more direct current or alternating current power supplies, recharging systems, power supply failure detection circuits, power converters or inverters, power supply status indicators and the like.

Although not shown in the FIG. 4, the mobile terminal 1200 may further include a camera (for example, a front camera or a rear camera), a BLUETOOTH module, and the like which are not further described herein. In the present embodiment, the display unit of the mobile terminal is a touch screen display, and the mobile terminal farther includes a memory and one or more programs. The one or more programs are stored in the memory and configured to be executed by one or more processors. The one or more programs contain instructions for performing the following operations.

A link is established between a mobile terminal and a smart television. The mobile terminal detects a state of the smart television every predetermined time interval. The mobile terminal receives an image located in front of the smart television and transmitted by the smart television, extracts facial features in the image according to an image processing algorithm, and determines that an audience watching the smart television is a minor or an older person according to the facial features in the image.

When the audience watching the smart television is a minor, the mobile terminal acquires a current playing time, a playing content and a playing duration of the smart television and determines whether the current playing time, the playing content and the playing duration conform to conditions preset by the user. If yes, the smart television continues to play. If no, the smart television is controlled to display a hint of switching a channel or to increase or decrease watching time according to answer results of the audience after entering a reward and punishment display process.

The mobile terminal detects whether the smart television is in the turned-on state when the audience watching the smart television is an older person. When the smart television is in the turned-off state, the smart television is controlled to be turned on to play the television program.

In some embodiments, before the step of establishing the link between the mobile terminal and the smart television, the following step is included.

An allowable playing time, an allowable playing content and an allowable playing duration corresponding to the smart television are preset when the audience is the minor.

In some embodiments, when the audience watching the smart television is the minor, the mobile terminal acquires a current playing time, a playing content and a playing duration of the smart television and determines whether the current playing time, the playing content and the playing duration conform to conditions preset by the user. If yes, the smart television continues to play. If no, the step of controlling the smart television to display the hint of switching the channel specifically includes the following steps.

When the audience watching the smart television is the minor and the information of the turned-on state of the smart television is acquired, time of the playing duration starts to be counted and it is determined whether the playing time of the smart television is within the preset allowable playing time.

When the playing time of the smart television is within the preset allowable playing time, it is determined whether the displayed content conforms to the preset allowable playing content. When the displayed content conforms to the preset allowable playing content, it is determined whether the playing duration is longer than or equal to the preset allowable playing duration. When the playing duration is longer than the preset allowable playing duration, the smart television is controlled to remind to turn off the smart television.

When the playing time of the smart television is not within the preset allowable playing time, the smart television is controlled to remind to turn off the smart television.

In some embodiments, the step of controlling the smart television to remind to turn off the smart television includes the following steps.

The mobile terminal remotely controls a button for turning off the smart television, so as to turn off the smart television.

In some embodiments, after the step of starting to count the time of the playing duration, the following step is included.

When the counted time is equal to the rest time preset by the user of the terminal, a text, a voice or a video that is recorded by the user of the terminal now or in advance to the smart television is transmitted to the smart television via the network, so as to remind the audience of the smart television to rest or exercise.

In some embodiments, when the audience watching the smart television is the minor, the mobile terminal acquires a current playing time, a playing content and a playing duration of the smart television and determines whether the current playing time, the playing content and the playing duration conform to conditions preset by the user. If yes, the smart television continues to play. If no, the step of increasing or decreasing watching time according to answer results of the audience after entering a reward and punishment display process specifically includes the following steps.

When the audience watching the smart television is the minor and the information of the turned-on state of the smart television is acquired, time of the playing duration starts to be counted and it is determined whether the playing time of the smart television is within the preset allowable playing time.

When the playing time of the smart television is within the preset allowable playing time, it is determined whether the displayed content conforms to the preset allowable playing content. When the displayed content conforms to the preset allowable playing content, it is determined whether the playing duration is longer than or equal to the preset allowable playing duration. When the playing duration is longer than the preset allowable playing duration, the smart television is controlled to increase or decrease the watching time according to the answer results of the audience after the smart television is controlled to enter the reward and punishment display process.

When the playing time of the smart television is not within the preset allowable playing tune, the smart television is controlled to increase or decrease the watching time according to the answer results of the audience after the smart television is controlled to enter the reward and punishment display process.

In some embodiments, the step of controlling the smart television to increase or decrease the watching time according to the answer results of the audience after the smart television is controlled to enter the reward and punishment display process specifically includes the following steps.

The smart television is controlled to enter the reward and punishment display process. The mobile terminal receives a command from the user of the mobile terminal, outputs questions selected from a preset question database and prompts the audience to answer the questions.

The answer results of the audience are received, and it is determined whether a number of the questions having correct answers is greater than or equal to an answer threshold value preset by the user of the terminal. If the number of the questions having the correct answers is greater than the answer threshold value, the mobile terminal controls the smart television to extend the current playing duration. If the number of the questions having the correct answers is fewer than the answer threshold value, the mobile terminal controls the smart television to be turned off and to shorten a playing duration of the smart television next time.

It should be understood that present disclosure is not limited to the exemplary examples. Those skilled in the art in the art may achieve equivalent improvements or replacements according to the above description. The equivalent improvements and replacements should be considered to belong to the protection scope of the present disclosure.

What is claimed is:

1. A mobile terminal, comprising:
at least one processor; and
at least one memory,
wherein the at least one memory is configured to store instructions and data, and the at least one processor is configured to execute the instructions to perform the steps of:
establishing a link between the mobile terminal and a smart television, detecting a state of the smart television every predetermined time interval by the mobile terminal, receiving, by the mobile terminal an image located in front of the smart television and transmitted by the smart television, extracting facial features in the image according to an image processing algorithm, and determining that an audience watching the smart television is a minor or an older person according to the facial features in the image;
acquiring, by the mobile terminal, a current playing time, a playing content and a playing duration of the smart television and determining whether the current playing time, the playing content and the playing duration conform to conditions preset by a user, when the audience watching the smart television is the minor; if yes, the smart television continues to play; if no, the smart television is controlled to increase or decrease watching time according to answer results of the audience after entering a reward and punishment display process; and
detecting whether the smart television is in a turned-on state by the mobile terminal when the audience watching the smart television is the older person; the smart television is controlled to be turned on to play a television program when the smart television is in the turned-off state;
wherein the step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to increase or decrease the watching time according to the answer results of the audience after entering the reward and punishment display process, comprising the steps of:
starting to count time of the playing duration and determining whether the playing time of the smart television is within a preset allowable playing time, when the audience watching the smart television is the minor and information of the turned-on state of the smart television is acquired;
determining whether the displayed content conforms to a preset allowable playing content when the playing time of the smart television is within the preset allowable playing time; determining whether the playing duration is longer than or equal to a preset allowable playing duration when the displayed content conforms to the preset allowable playing content;
increasing or decreasing the watching time according to the answer results of the audience after the smart television is controlled to enter the reward and punishment display process, when the playing duration is longer than the preset allowable playing duration; and
increasing or decreasing the watching time according to the answer results of the audience after the smart television is controlled to enter the reward and punishment display process, when the playing time is not within the preset allowable playing time;
wherein the step of increasing or decreasing the watching time according to the answer results of the audience after the smart television is controlled to enter the reward and punishment display process comprises the steps of:
controlling the smart television to enter the reward and punishment display process, receiving a command from the user by the mobile terminal, outputting questions selected from a preset question database, and prompting the audience to answer the questions; and
receiving the answer results of the audience, determining whether a number of the questions having correct answers is greater than or equal to an answer threshold value preset by the user of the mobile terminal; if the number of the questions having the correct answers is greater than the answer threshold value, the mobile terminal controls the smart television to extend the current playing duration; if the number of the questions having the correct answers is fewer than the answer threshold value, the mobile terminal controls the smart television to be turned off and to shorten a playing duration of the smart television next time.

2. The mobile terminal of claim 1, before the step of establishing the link between the mobile terminal and the smart television, further comprising the step of:

presetting the allowable playing time, the allowable playing content and the allowable playing duration corresponding to the smart television when the audience is the minor.

3. A method for remotely controlling a smart television based on a mobile terminal, comprising the steps of:

establishing a link between the mobile terminal and a smart television, detecting a state of the smart television every predetermined time interval by the mobile terminal, and receiving a command input from a user to acquire a type of an audience watching the smart television;

acquiring, by the mobile terminal, a current playing time, a playing content and a playing duration of the smart television and determining whether the current playing time, the playing content and the playing duration conform to conditions preset by a user, when the audience watching the smart television is a minor; if yes, the smart television continues to play; if no, the smart television is controlled to increase or decrease watching time according to answer results of the audience after entering a reward and punishment display process; and detecting whether the smart television is in a turned-on state by the mobile terminal when the audience watching the smart television is an older person; the smart television is controlled to be turned on to play a television program when the smart television is in the turned-off state;

wherein the step of acquiring, by the mobile terminal, the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to increase or decrease the watching time according to the answer results of the audience after entering the reward and punishment display process, comprising the steps of:

starting to count time of the playing duration and determining whether the playing time of the smart television is within a preset allowable playing time, when the audience watching the smart television is the minor and information of the turned-on state of the smart television is acquired;

determining whether the displayed content conforms to a preset allowable playing content when the playing time of the smart television is within the preset allowable playing time;

determining whether the playing duration is longer than or equal to a preset allowable playing duration when the displayed content conforms to the preset allowable playing content;

increasing or decreasing the watching time according to the answer results of the audience after the smart television is controlled to enter the reward and punishment display process, when the playing duration is longer than the preset allowable playing duration; and increasing or decreasing the watching time according to the answer results of the audience after the smart television is controlled to enter the reward and punishment display process, when the playing time is not within the preset allowable playing time;

wherein the step of increasing or decreasing the watching time according to the answer results of the audience after the smart television is controlled to enter the reward and punishment display process comprises the steps of:

controlling the smart television to enter the reward and punishment display process, receiving a command from the user by the mobile terminal, outputting questions selected from a preset question database, and prompting the audience to answer the questions; and receiving the answer results of the audience, determining whether a number of the questions having correct answers is greater than or equal to an answer threshold value preset by the user of the mobile terminal; if the number of the questions having the correct answers is greater than the answer threshold value, the mobile terminal controls the smart television to extend the current playing duration; if the number of the questions having the correct answers is fewer than the answer threshold value, the mobile terminal controls the smart television to be turned off and to shorten a playing duration of the smart television next time.

4. The method for remotely controlling the smart television based on the mobile terminal of claim 3, before the step of establishing the link between the mobile terminal and the smart television, the method further comprising the step of:

presetting the allowable playing time, the allowable playing content and the allowable playing duration corresponding to the smart television when the audience is the minor.

5. A system for remotely controlling a smart television based on a mobile terminal, comprising at least one processor; at least one memory; and at least one application program, wherein the at least one application program is stored in the at least one memory and configured to be executed by the at least one processor to perform the steps of:

establishing a link between the mobile terminal and a smart television, detect a state of the smart television every predetermined time interval, and receive a command input from a user to acquire a type of an audience watching the smart television;

acquiring a current playing time, a playing content and a playing duration of the smart television and determine whether the current playing time, the playing content and the playing duration conform to conditions preset by a user, when the audience watching the smart television is a minor; if yes, the smart television continues to play; if no, the smart television is controlled to increase or decrease watching time according to answer results of the audience after entering a reward and punishment display process; and detecting whether the smart television is in a turned-on state by the mobile terminal when the audience watching the smart television is an older person; the smart television is controlled to be turned on to play a television program when the smart television is in the turned-off state;

wherein the step of acquiring the current playing time, the playing content and the playing duration of the smart television and determining whether the current playing time, the playing content and the playing duration conform to the conditions preset by the user, when the audience watching the smart television is the minor; if yes, the smart television continues to play; if no, the smart television is controlled to increase or decrease the watching time according to the answer results of the audience after entering the reward and punishment display process, comprising the steps of:

starting to count time of the playing duration and determining whether the playing time of the smart television is within a preset allowable playing time, when the audience watching the smart television is the minor and information of the turned-on state of the smart television is acquired;

determining whether the displayed content conforms to a preset allowable playing content when the playing time of the smart television is within the preset allowable playing time;

determining whether the playing duration is longer than or equal to a preset allowable playing duration when the displayed content conforms to the preset allowable playing content;

increasing or decreasing the watching time according to the answer results of the audience after the smart television is controlled to enter the reward and punishment display process, when the playing duration is longer than the preset allowable playing duration; and increasing or decreasing the watching time according to the answer results of the audience after the smart television is controlled to enter the reward and punishment display process, when the playing time is not within the preset allowable playing time;

wherein the step of increasing or decreasing the watching time according to the answer results of the audience after the smart television is controlled to enter the reward and punishment display process comprises the steps of:

controlling the smart television to enter the reward and punishment display process, receiving a command from the user by the mobile terminal, outputting questions selected from a preset question database, and prompting the audience to answer the questions; and receiving the answer results of the audience, determining whether a number of the questions having correct answers is greater than or equal to an answer threshold value preset by the user of the mobile terminal; if the number of the questions having the correct answers is greater than the answer threshold value, the mobile terminal controls the smart television to extend the current playing duration; if the number of the questions having the correct answers is fewer than the answer threshold value, the mobile terminal controls the smart television to be turned off and to shorten a playing duration of the smart television next time.

6. The system for remotely controlling the smart television based on the mobile terminal of claim 5, wherein the at least one application program is further configured to be executed by the at least one processor to perform the steps of:

presetting the allowable playing time, the allowable playing content and the allowable playing duration corresponding to the smart television when the audience is the minor.

7. The system for remotely controlling the smart television based on the mobile terminal of claim 5, wherein the at least one application program is further configured to be executed by the at least one processor to perform the steps of: receiving an image located in front of the smart television and transmitted by the smart television, extracting facial features in the image according to an image processing algorithm, and determining that an audience watching the smart television is the minor or the older person according to the facial features in the image.

* * * * *